United States Patent
Hardie et al.

(10) Patent No.: US 12,260,563 B1
(45) Date of Patent: *Mar. 25, 2025

(54) WARPING SIMULATOR METHOD OF DETECTING AND ACCOUNTING FOR TRUE MOTION OF IMAGERY SUBJECT TO ATMOSPHERIC TURBULENCE

(71) Applicants: Russell Hardie, Centerville, OH (US); Richard Van Hook, Xenia, OH (US)

(72) Inventors: Russell Hardie, Centerville, OH (US); Richard Van Hook, Xenia, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 440 days.

This patent is subject to a terminal disclaimer.

(21) Appl. No.: 17/861,173

(22) Filed: Jul. 9, 2022

Related U.S. Application Data

(60) Provisional application No. 63/284,233, filed on Nov. 30, 2021, provisional application No. 63/230,200, filed on Aug. 6, 2021.

(51) Int. Cl.
*G06T 7/33* (2017.01)
*G06T 3/18* (2024.01)
(Continued)

(52) U.S. Cl.
CPC ............... *G06T 7/248* (2017.01); *G06T 3/18* (2024.01); *G06T 5/20* (2013.01); *G06T 7/337* (2017.01);
(Continued)

(58) Field of Classification Search
CPC ........... G06T 7/248; G06T 7/337; G06T 3/18; G06T 5/20; G06T 2207/10016;
(Continued)

(56) References Cited

U.S. PATENT DOCUMENTS 9,104,027 B2  8/2015  Hall
9,395,438 B1  7/2016  Woodell et al.
(Continued)

OTHER PUBLICATIONS

Van Hook and Hardie, Scene motion detection in imagery with anisoplanatic optical turbulence using a tilt-variance-based Gaussian mixture model, Applied Optics, vol. 60, No. 25, Sep. 2021, 1559-128X/21/250G91-16 Journal © 2021 Optical Society of America.

*Primary Examiner* — Lin Ye
*Assistant Examiner* — Fayez A Bhuiyan
(74) *Attorney, Agent, or Firm* — AFMCLO/JAZ; Larry L. Huston

(57) ABSTRACT

A method for determining the likelihood that a pixel in a video image sequence represents true motion in the image. Light from a scene is captured to yield an original image having a sequence of frames. A prototype image is created from the original image as a geometrically accurate representation of the scene which is substantially free of contamination. A tilt variance-Gaussian mixture model and/or multi-variate Gaussian model, based upon optical turbulence statistics associated with the scene, is developed. Each pixel in the original image sequence of frames is evaluated against the prototype image using a probability density function, to yield a likelihood that the respective pixel represents true motion.

20 Claims, 9 Drawing Sheets

(51) Int. Cl.
  *G06T 5/20* (2006.01)
  *G06T 7/246* (2017.01)
  *H04N 23/68* (2023.01)

(52) U.S. Cl.
  CPC ....... *H04N 23/6811* (2023.01); *H04N 23/683* (2023.01); *G06T 2207/10016* (2013.01); *G06T 2207/20032* (2013.01); *G06T 2207/20076* (2013.01)

(58) Field of Classification Search
  CPC .......... G06T 2207/20032; G06T 2207/20076; H04N 23/683; H04N 23/6811
  See application file for complete search history.

(56) References Cited

U.S. PATENT DOCUMENTS

| | | |
|---|---|---|
| 9,780,872 B2 | 10/2017 | Ren et al. |
| 10,281,483 B2 | 6/2019 | Galetti |
| 10,733,708 B2 | 8/2020 | Fleizach et al. |
| 2013/0100308 A1 | 4/2013 | Schutte |
| 2016/0056892 A1 | 2/2016 | Betin et al. |
| 2020/0099861 A1 | 3/2020 | Wayne et al. |
| 2021/0125348 A1 | 4/2021 | Bose-Pillai |
| 2022/0036579 A1 | 2/2022 | Liang |
| 2023/0046545 A1* | 2/2023 | Van Hook .......... H04N 23/6845 |

\* cited by examiner

| Parameter | Value |
|---|---|
| Aperture | $D = 0.2034$ (m) |
| Focal length | $l = 1.2000$ (m) |
| F-number | 5.8997 |
| Wavelength | $\lambda = 0.5250$ (μm) |
| Object distance | $L = 7000$ (m) |
| Pixel spacing (Nyquist) | $p = 1.5487$ (μm) |
| Optical cutoff frequency | $\rho_c = 322.8571$ (cycles/mm) |

Fig. 2A

| Parameter | Turbulence Degradation | | | | | |
|---|---|---|---|---|---|---|
| | Level 1 | Level 2 | Level 3 | Level 4 | Level 5 | Level 6 |
| $C_n^2 \times 10^{-15}$ $(m^{-2/3})$ | 0.0307 | 0.1227 | 0.4909 | 1.9638 | 4.4187 | 7.8554 |
| Theoretical $r_0$ (m) | 0.3863 | 0.1681 | 0.0732 | 0.0319 | 0.0196 | 0.0139 |
| Theoretical $D/r_0$ (unitless) | 0.5265 | 1.2097 | 2.7789 | 6.3843 | 10.3857 | 14.6676 |
| Isoplanatic angle (pixels) | 13.4454 | 5.8516 | 2.5472 | 1.1087 | 0.6816 | 0.4826 |
| RMS Z-tilt $\sigma_T$ (pixels) | 0.5000 | 1.0000 | 2.0000 | 4.0000 | 6.0000 | 8.0000 |
| Residual RMS Tilt (pixels) | 0.3576 | 0.7153 | 1.4304 | 2.8608 | 4.2915 | 5.7221 |

Fig. 2B

WARPING SIMULATOR METHOD OF DETECTING AND ACCOUNTING FOR TRUE MOTION OF IMAGERY SUBJECT TO ATMOSPHERIC TURBULENCE

CROSS REFERENCE TO RELATED APPLICATIONS

This application claims priority to and the benefit of application Ser. No. 63/230,200 filed Aug. 6, 2021 and application serial number application Ser. No. 63/284,233 filed Nov. 30, 2021, the disclosures of which are incorporated herein by reference.

STATEMENT OF GOVERNMENT INTEREST

The invention described and claimed herein may be manufactured, licensed and used by or for the Government of the United States of America for all government purposes without the payment of any royalty.

FIELD OF THE INVENTION

The present invention relates to a method of moving foreground and static background pixel classification, and more particularly to a classification method for using image data representing effects of anisoplanatic atmospheric optical turbulence.

BACKGROUND OF THE INVENTION

In wide field-of-view video acquisition over long ranges, atmospheric optical turbulence undesirably imparts geometric distortion and blurring to images. The geometric warping can make stationary objects appear to move. Atmospheric turbulence is caused by gradients in air temperature and/or air density which cause corresponding gradients in the refractive index. Such gradients are characterized by by the Fried coherence parameter $r_0$ or the refractive index structure parameter $C_n^2$.

Atmospheric optical turbulence tends to behave in an anisoplanatic manner. Such anisoplanatic turbulence imparts quasi-periodic geometric distortions that are both spatially and temporally varying. There is also a spatially and temporally varying short-exposure atmospheric optical transfer function (OTF) that causes blurring. Geometric distortions from turbulence can cause stationary objects, such as building edges, to appear to move in video. Real in-scene motion, such as a moving car or pedestrian, may be difficult to distinguish from turbulence warping. And as turbulence levels increase, pixel classification becomes a highly non-trivial task. The ability to accurately detect and distinguish true scene motion from apparent motion due to turbulence is important for robust turbulence mitigation (TM) processing, background subtraction/foreground segmentation, providing preliminary detection candidates for target tracking and cueing systems, scene motion analysis, and turbulence characterization, as discussed in part below.

Prior art techniques for TM to cope with dynamic scenes can largely be broken into two main categories: motion field and pixel intensity models. Motion field methods attempt to discriminate between real motion and turbulent motion using estimated motion magnitude and/or direction with respect to a constructed reference frame. Pixel intensity methods rely on fluctuations in brightness to attempt to distinguish foreground motion from background variations.

Many prior art attempts to account for turbulence-induced geometric warping by estimating short exposure frames of a video sequence. Such methods attempted some form of dewarping to correct the geometry and allow for improved image restoration. However, many such methods erroneously assumed all motion to be turbulence motion. Thus, real moving objects in the scene could be heavily distorted or blurred beyond recognition. Other approaches only considered the qualitative behavior of turbulence such as zero-mean displacement. But these approaches rely upon both background and moving objects and are therefore subject to contamination by the moving objects.

The present invention overcomes the shortcomings of the prior art by providing more robust scene motion detection in video which has been degraded by atmospheric optical turbulence. This detection method incorporates quantitative turbulence statistics and operates on a per-image and per-pixel basis. The present invention advantageously does not rely solely on empirical data to estimate the model parameters, as required by intensity-based motion-detection algorithms in the prior art. Using the present invention, one takes a video sequence, optionally registers the video sequence, (i.e., performs a spatial alignment of all video frames to a reference frame), and then applies a rank filter to create a movement-free background image with approximately correct scene geometry. The present invention builds a background statistical model of the intensity fluctuations using the median and turbulence statistics. Pixels that do not fit the background model are declared as true scene motion (i.e., foreground). The remaining pixels are classified as stationary background. By detecting and treating moving foreground object pixels differently from static background pixels, one of skill can ensure the preservation of important scene features during TM processing.

SUMMARY OF THE INVENTION

In one embodiment the invention is a tilt variance Gaussian mixture model (TV-GMM) based foreground detection method usable for video with anisoplanatic atmospheric optical turbulence. The input is a series of images that may be degraded by atmospheric optical turbulence, and the output is a per-image/per-pixel likelihood as to whether or not a particular pixel is background or foreground.

The apparatus and method of the present invention take the median of the input images to create a single prototype frame of the scene background.

The apparatus and method of the present invention take the median of the input images to create a single prototype frame of the scene background.

This method provides per-image, per-pixel turbulence detection likelihood values of imagery taken through anisoplanatic optical atmospheric turbulence. A rank-filtered background image provides a contamination-free, or substantially contamination free, reference frame. This reference frame, in conjunction with knowledge or estimates of atmospheric turbulence from when the images were collected, allows improved motion detection accuracy in the presence of atmospheric turbulence.

Each pixel within a finite window of the pixel in question is taken to be the mean of a mode in a Gaussian mixture model (GMM) background intensity fluctuation model for that pixel. The weight of each mode is computed with a Gaussian function and is based on the mode pixel location and the local residual tilt variance. This weight is used to capture the likelihood that turbulence warping will bring each neighboring pixel value to the center of the window. All of the mode variances are set to be the sample variance of the pixels in the finite window plus the assumed image noise variance. Optionally, one of skill may reduce the number of modes in the GMM by incorporating quantization. Global registration to align all input images and application of a rank filter to act as a non-contaminated background reference frame may also be used.

In a second embodiment, and similar to the first embodiment, the invention comprises a method of determining the likelihood a pixel in a video image subject to optical turbulence represents true motion. In the method, a series of images is optionally spatially registered via a whole-pixel translation using a least-mean-squares approach to a reference image from the collection of images. Then, a rank filter is applied to the optionally registered image stack to create a reference frame. This reference frame is a geometrically accurate representation of the scene background without contamination caused by actual motion.

But the second embodiment uses a warping simulator uses an estimate of the turbulence strength to geometrically warp the reference image, creating multiple realizations of the background image as subjected to physically accurate turbulence warping without duplicating any blurring effects. Then, for each pixel in the synthetic image stack, a finite window centered on the subject pixel is extracted. For each subject pixel, a multivariate Gaussian model is formed with the intensity of each pixel in the window being treated as a separate variable. For multi-band imagery, such as RGB images from cell phone cameras, each color band in each pixel is treated as a separate variable.

This prototype is used as an input frame to a warping simulator which applies geometric distortions. The output of the warping simulator is a no contaminated image stack whose J frames contain only the background scene but still exhibit the warping of the original images. Each pixel location within an M×M patch of the non-contaminated image stack is treated as a separate variable in a multivariate Gaussian Model. The Gaussian's covariance is the covariance of the M×M patch for all J frames with added variance on the diagonal to account for image noise and other error.

And as discussed above relative to the first embodiment, each pixel in the original image sequence is either evaluated against the per-pixel, non-contaminated probability density function (PDF) from the multivariate Gaussian model or the probabilities are converted to a negative log likelihood (NLL) value as a more convenient detection statistic. Values of 0 indicate a perfect match with the background (i.e., no motion), and increasingly larger values indicate increasing likelihood that a pixel contains true in-scene motion. These per-image, per-pixel output likelihoods can then be used for robust turbulence mitigation, image restoration, target tracking and cueing systems, and other applications.

BRIEF DESCRIPTION OF THE DRAWINGS

FIG. 1A is a schematic representation of a first embodiment of a video apparatus usable with the present invention.

FIG. 2A is a table of optical parameters usable for simulation according to the present invention.

FIG. 2B is a table of turbulence parameters usable for simulation according to the present invention.

DETAILED DESCRIPTION OF THE INVENTION

Figure 1B:
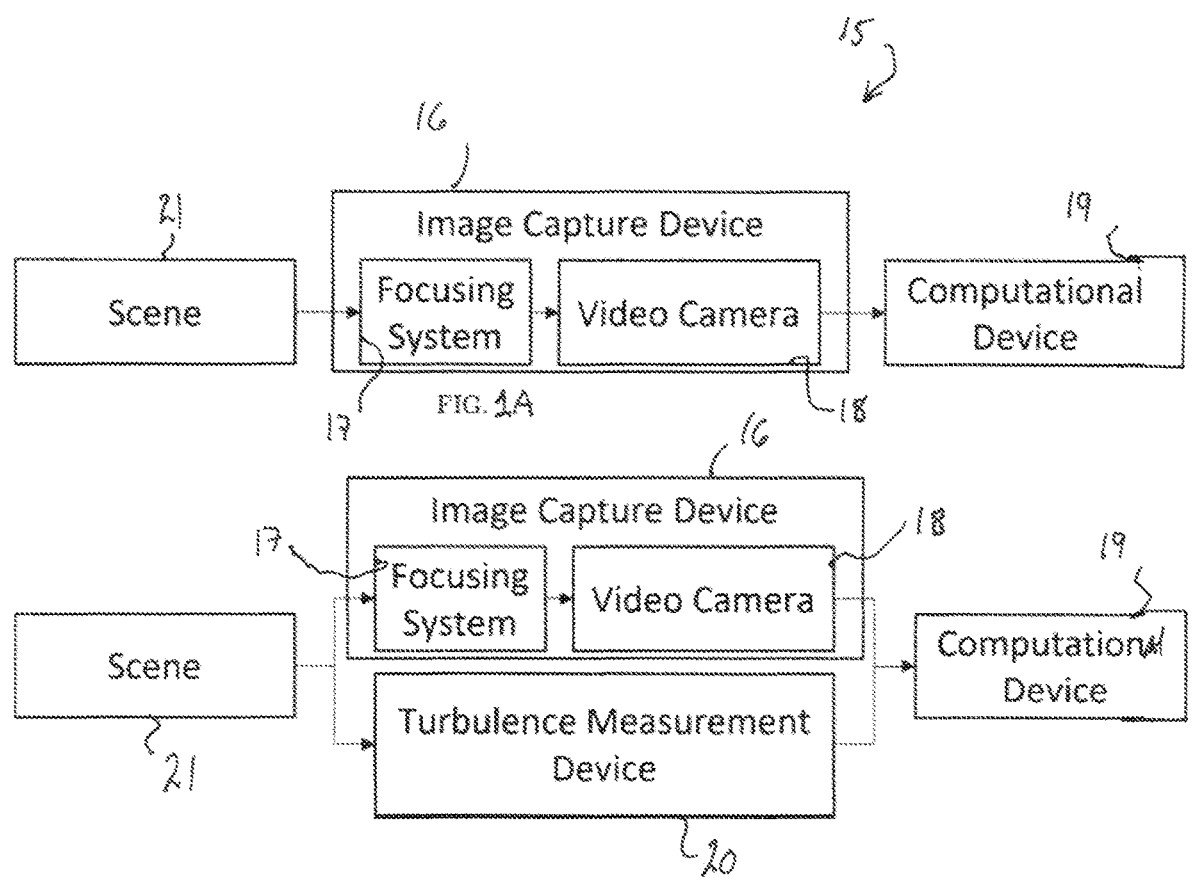
FIG. 1B is a schematic representation of a second embodiment of a video apparatus usable with the present invention.

Referring to FIG. 1A an apparatus 15 according to the present invention may comprise an image capture device 16 which receives visible light photons from a scene 21. The image capture device 16 in turn, comprises a focusing system 17 and video camera 18. In one embodiment, incoming light from a scene 21 is captured by the image capture device 16. The device consists of a focusing system 17 and a video camera 18. The focusing system 17, consisting of a combination of lenses and/or mirrors, generates an optical image of the scene 21 to the video camera 18. The video camera 18 creates a digital representation of that environment by converting photons from the scene 21 into electrons. This digital representation may be referred to as an image, a frame, an image stack, a frame stack, an image sequence, a video, or a video stream. The digital representation is provided to a computational device 19, which calculates a per-frame, per-pixel likelihood of a pixel containing in-scene 21 motion. The computational device 19 may consist of one or more computers, servers, field programmable gate arrays (FPGAs), architecture-specific integrated circuits (ASICs), etc.

Referring to FIG. 1B, in a second embodiment, the apparatus 15 may further comprise a turbulence measurement device 20. The turbulence measurement device 20 may be a scintillometer which measures refractive index fluctuations, differential image motion monitor, scene-based method employing a standard camera, etc. The turbulence measurement device may be used in conventional manner to determine the refractive index structure parameter $C_n^2(z)$. Knowing the optical parameters and the refractive index structure parameter $C_n^2$ the tilt variance statistics may be computed.

Using either the embodiment of FIG. 1A or FIG. 1B, a background statistical model is generated directly from a prototype image. An input image sequence is spatially registered, and the search space for the registration 32 is limited based upon turbulence statistics (either measured or estimated). An aligned image sequence is then rank filtered to produce a contamination-free prototype image. A median filter has been found to work well. One of skill will understand that other rank filters (e.g., mean, alpha-trimmed median, etc.) are also suitable, so long as the filter provides approximately-correct background geometry while also eliminating foreground scene 21 motion.

For each pixel in the prototype image, a GMM representing the true scene 21 background content is created from neighboring pixels and knowledge of the turbulence. Knowledge of the turbulence (either measured or estimated) is advantageously used to determine which neighboring pixels are included in the creation of the GMM and the proportional weighting of those pixels in the creation of the GMM. The number of modes in the GMM is optionally reduced to minimize computational complexity. For all pixels in the input image sequence, the likelihood of each pixel being background is calculated from the GMM's probability density function (PDF). These per-pixel, per-image output likelihoods may be an output of the present invention.

Alternatively, per-pixel, per-image output likelihoods may be combined to provide spatially-correlated and/or temporally-correlated per pixel likelihoods as another output of the invention. Additionally, the per-pixel likelihoods may be converted to other detection statistics (including but not limited to negative log likelihood) as an output of the invention. Collectively, detection statistics such as but not limited to, the probability density function and negative log likelihood, are herein referred to as likelihood functions. [Applicant can be his/her own lexicographer].

Atmospheric optical turbulence is typically characterized by the refractive index structure parameter denoted by the variable $C_n^2$ and has units of $m^{-2/3}$. In some imaging scenarios, this parameter may vary along the optical path. In such cases, the refractive index structure parameter is represented as the function $C_n^2(z)$ where z is the distance between the light source and the focusing system 17 of the image capture device 16. Another key turbulence statistic is the atmospheric coherence diameter or Fried parameter. The Fried parameter $r_0$ plays a significant role in defining the level of blurring and warping due to atmospheric optical turbulence. In the case of spherical wave propagation, the Fried parameter can be expressed in terms of $C_n^2(z)$ as:

$$r_0 = \left[ 0.423 \left(\frac{2\pi}{\lambda}\right)^2 \int_{z=0}^{z=L} C_n^2(z) \left(\frac{Z}{L}\right)^{5/3} dz \right]^{-3/5} \quad \text{Eq. 1}$$

where $\lambda$ is the wavelength and L is the optical path length.

The turbulence warping motion can be characterized by the point source angular tilt-variance statistic. For a given point source position, the apparent tilt vector in units of radians is denoted by:

$$\sigma_T^2 = \langle \alpha_{T_x}^2 \rangle = \langle \alpha_{T_y}^2 \rangle = 0.1820 \left(\frac{D}{r_0}\right)^{5/3} \left(\frac{\lambda}{D}\right)^2 \quad \text{Eq. 2}$$

where D is the aperture diameter of the optics and $\langle \cdot \rangle$ is the ensemble mean operator. The ratio of the aperture to $r_0$ plays a role in governing the level of tilt variance. As this ratio increases, so does the tilt variance. This increasing ratio makes it more difficult to perform scene 21 motion detection as the turbulence motion frequently leads to static background pixels being incorrectly classified as a moving pixel.

Using the small angle approximation, the tilt vector can be expressed in units of pixels by multiplying by the focal length and dividing by the pixel spacing. One can then model the tilt warping at each pixel as a 2D Gaussian random vector with variance given by the theoretical atmospheric tilt variance. Thus, the tilt vector is a zero-mean normal random vector specified as $\alpha_T \sim N(0, \sigma_T^2)$.

The global image tilt may be calculated as the average of the tilt fields over the full image size. The residual tilt, after optional global registration 32, may then be interpreted as the difference between each pixel's associated tilt and the global frame average tilt. This difference operation is modeled as a linear spatial filtering process for each pixel, representing a weighted sum of the tilts. This weighted sum provides a way to compute the 2D output autocorrelation functions for the filtered random processes. Such output autocorrelations may be evaluated at the origin to yield the residual tilt variance for each pixel. Such residual tilt variance represents a form of differential tilt variance. Such differential tilt variance is the difference between each pixel and the global frame average, representing the differential between two spatial locations.

Because each spatial position has a different relationship to the global average, the residual tilt variance then turns out to be spatially varying and different in the horizontal and vertical dimensions. If optional registration 32 is not performed as described below, then the residual tilt variance is simply the input tilt variance. But the present invention can help improve scene 21 motion detection by suppressing the global component of the turbulence motion in the imagery.

Referring to FIGS. 2A and 2B, for the proposed motion detection algorithm, one of skill may use knowledge of the optical parameters and sufficient information about the turbulence to provide a reasonable estimate of the tilt variance or residual tilt variance. Table 1 of FIG. 2A provides non-limiting and exemplary parameters for aperture, focal length, F-number, wavelength, distance to the object of interest, Nyquist pixel spacing, and optical cutoff frequency which are local to the image under consideration. Table 2 of FIG. 2B provides parameters for $C_n^2$, theoretical theoreticalD/$r_0$, isoplanatic angle, RMS Z-tilt, and residual RMS tilt for turbulence degradation Levels 1-6. One of skill will recognize other values are suitable. The present invention has been found to be beneficially in very light to very heavy turbulence, ranging from $C_n^2$ values from 1E-17 $m^{-2/3}$ (light turbulence) to 1E-13 $m^{-2/3}$ (very heavy turbulence) One of skill will recognize that long optical propagation distances in light turbulence and short optical propagation distances in heavy turbulence may impart similar warping and blurring effects to imagery.

The present invention is specifically useful for applications with anisoplanatic turbulence, using the turbulence statistics of Table 1 and Table 2. Experimental results cited herein, unexpectedly show that using knowledge of the turbulence statistics with the claimed method 30 yields improved detection performance compared to prior art techniques.

If image registration 32 is not employed, the present invention may use an estimate of the Fried parameter to compute the tilt variance of Eq. 3. But if registration 32 is used, then one of skill may employ the residual tilt covariance given by:

$$\sum_R(n) = \begin{bmatrix} \sigma_{R_{xx}}^2 & \sigma_{R_{xy}}^2 \\ \sigma_{R_{xy}}^2 & \sigma_{R_{yy}}^2 \end{bmatrix}.$$ Eq. (3)

Computing this covariance matrix requires knowledge of the $C_n^2(z)$ profile. However, it is advantageously shown that the residual tilt variance is not highly sensitive to variations along the optical path. In practice, $C_n^2(z)$ may be obtained using a scintillometer, differential image-motion monitor, or scene 21-based method 30 employing a standard camera. Note that for a constant $C_n^2(z)$ profile, it is sufficient to have only knowledge of the Fried parameter if the full profile is intractable. Furthermore, the method 30of the present invention is beneficially not overly sensitive to errors in $r_0$. And other parameters used by the method 30 of the present invention may be estimated from the observed image data.

The present anomaly-detection method 30 uses the tilt-variance-based GMM. The TV-GMM 35 captures neighboring pixel values in proportion to the likelihood that the turbulence warping will bring each of the neighboring pixels to the window center.

When global registration 32 is employed, the weight of each mode in the GMM is determined by both the residual tilt variance and the displacement from the center of the window and is given by:

$$w_{m(n)} = \frac{1}{2\pi} \left| \sum_R(n) \right|^{1/2} \times \exp\left\{ -\frac{1}{2} [x(m), y(m)] \sum_R^{-1}(n) [x(m), y(m)]^T \right\}$$ Eq. 4 where x(m) and y(m) are the x and y displacements of the sample relative to the window center at location n. In the case of no registration 32, the mode weight function simplifies to:

$$w_{m(n)} = \frac{1}{2\pi\sigma_T^2} \exp\left\{ -\frac{x(m)^2 + y(m)^2}{2\sigma_T^2} \right\}$$ Eq. 5

The TV-GMM 35 technique models background intensity fluctuations that are believed to result exclusively from turbulence and noise. This modeling is done on a pixel-by-pixel basis, providing accurate and granular results. When a pixel's intensity value is not well described by that pixel's GMM, the pixel is considered to be scene 21 motion. A higher threshold 37 for judging a pixel to be scene 21 motion may allow one to correctly detect more moving pixels, but will likely yield a corresponding increase in false detections as shown in the Receiver Operating Characteristic (ROC) curves discussed below.

Figure 3:
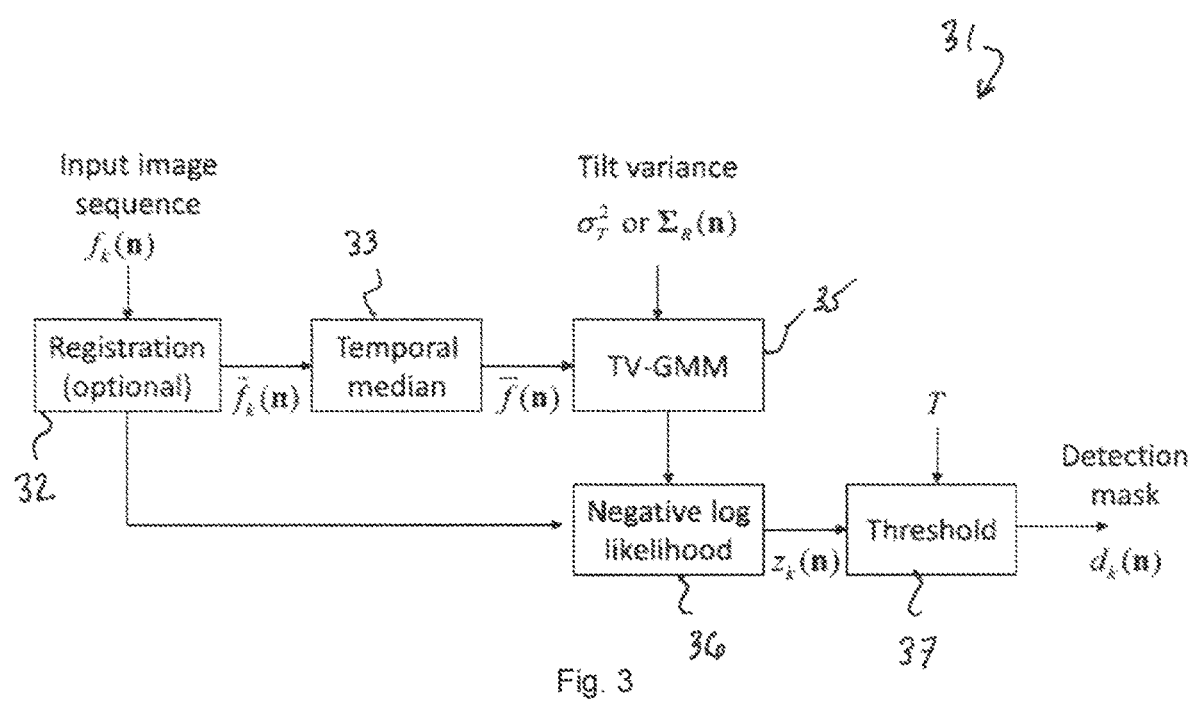
FIG. 3 is a flow chart of the steps of the motion detection method of the present invention.
Figure 4A:
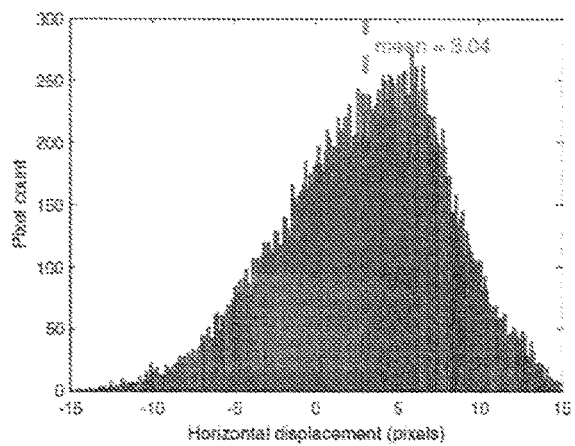
FIG. 4A is a histogram of turbulence-driven horizontal pixel displacement before global registration.
Figure 4B:
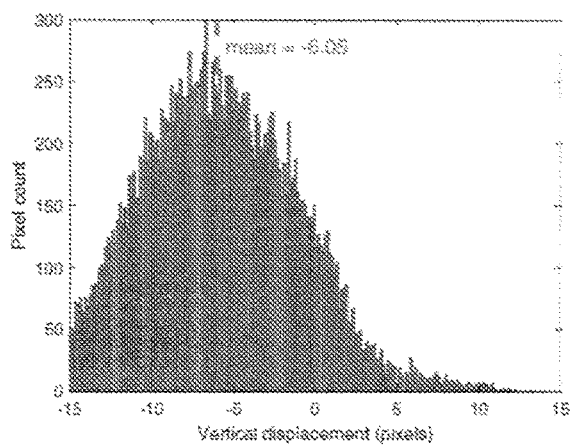
FIG. 4B is a histogram of turbulence-driven vertical pixel displacement before global registration.
Figure 4C:
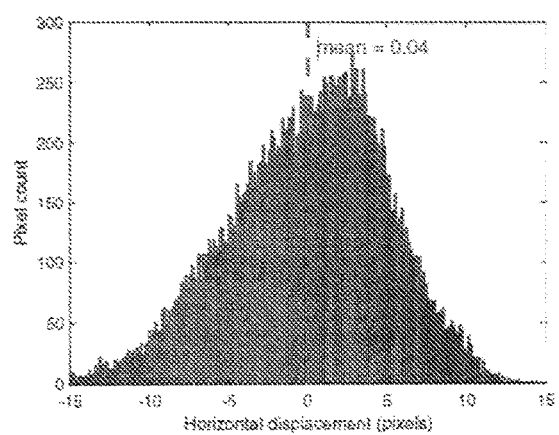
FIG. 4C is a histogram of turbulence-driven horizontal pixel displacement after global registration.
Figure 4D:
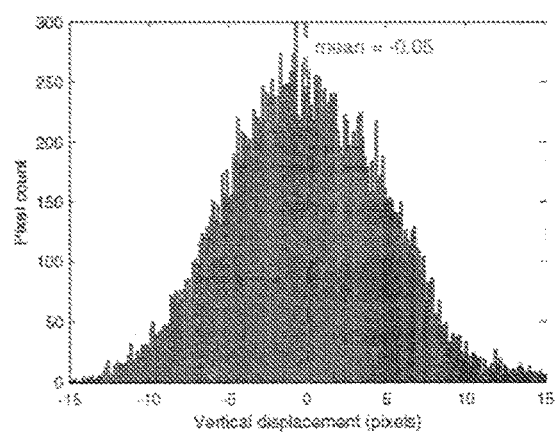
FIG. 4D is a histogram of turbulence-driven vertical pixel displacement after global registration.

Referring to FIG. 3, the method 30 of the present invention may be carried out according to the following steps. An input to the system is a sequence of short-exposure images. Frame k at pixel location n is denoted $f_k(n)$ for k=1, 2, . . . , K. The observed frames are taken to be the result of anisoplanatic optical turbulence that are known to cause spatially and temporally variable blur and warping. This relationship is expressed as:

$$f_k(n) = s_{k,n}[h_{k,n}[g_k(n)]] + \eta_k(n)$$ Eq. 6 where $g_k(n)$ is the ideal image representing the true object reflectance and $\eta_k(n)$ is an additive noise term. The noise term is considered to be an independent and identically distributed white Gaussian noise with variance $\sigma_n^2$. The operator $h_{k,n}[\cdot]$ represents the spatially and temporally varying blur. The operator $s_{k,n}[\cdot]$ represents the spatially and temporally varying warping. The warping is modeled using the tilt variance described herein. The warping and blurring operators in the above equation Eq. 6 are nested and not multiplied.

Then a global image registration 32 may optionally be constructed. This optional registration 32 may be performed to compensate for camera platform motion and/or to remove the global component of the tilt variance. The present invention uses a normalized cross-correlation operation to estimate the shift between a reference frame and all of the other frames. The frames are then aligned using an integer shift.

The present invention limits the cross-correlation search window to twice the RMS pixel Z-tilt to mitigate maximums whose displacement is unlikely. This limit advantageously provides maximum translation bounds based on the RMS Z-tilt based on turbulence statistics, improving performance over the prior art, as described below. Translation in global registration 32 is likewise limited, based upon turbulence strength.

All images in the input image sequence are spatially aligned with a reference image by means of a 2D translation. For a given frame $f_k$, for each possible combination of horizontal and vertical translation values within given maximum translation bounds, the mean-squared error in pixel intensities between the reference image and $f_k$ is calculated. The final horizontal and vertical translation value pair is taken from the corresponding horizontal and vertical shift which produced the lowest mean-squared error. Note that other error statistics may also be used. The maximum translation bounds are based on turbulence statistics. The RMS Z-tilt is a statistical measurement of the Euclidean distance we expect atmospheric turbulence to displace a pixel from its "true location" (i.e., location without turbulence) in an image. For convenience, one may use Z-tilt in units of "pixels". If so, one will set the maximum translation bound for each dimension to be a multiple of the RMS Z-tilt. The inventors have found that setting the maximum translation bound to 3x the RMS Z-tilt provides a sufficiently-large window for analysis, while still maintaining a reasonably-small search window such that computational time is not overly burdensome.

The best match within the search window is declared to be the shift estimate. We compute the RMS limit based on the theoretical tilt variance using knowledge of $r_0$ as given by Eq. 1.

Referring to FIG. 3 and to FIGS. 4A, 4B, 4C and 4D, the actual horizontal and vertical displacements of a single frame for a turbulence level of 6, before and after global registration 32 is applied. One can see that the global frame registration 32 shifts the tilt distribution towards zero and lowers the mean tilt for the frame. This type of global registration 32 advantageously reduces false positive scene 21-motion detections for many algorithms at only a small increase in computational burden.

The global image registration 32 represents frames as $f_k(n)$. This frame is formed into a prototype image $f(n)$ which represents an estimate of the static warp-free background image with no moving objects present. A temporal median 33 is believed to be highly effective in providing an image with the approximately correct background geometry, while robustly eliminating foreground scene 21 motion. The temporal median 33 for the entire reference image is represented as:

$$\tilde{f}(n) = \text{median}\{\tilde{f}_1(n), \tilde{f}_1(n), \ldots, \tilde{f}_K(n)\} \qquad \text{Eq. 7.}$$

The temporal median 33 prototype image and the tilt variance model are used to determine the background TV-GMM 35 intensity fluctuation probability density function (PDF) model. The TV-GMM 35 model predicts intensity fluctuations in the background due exclusively to turbulence and noise. Building the background model on the prototype image of Eq. 7 significantly reduces contamination from true scene 21 motion compared to prior art method 30 that directly use the observed temporal image sequence to estimate the background model. Accordingly, the present invention advantageously uses turbulence statistics, in a manner not known to be used in the prior art. The inventors have discovered the tilts closely follow a Gaussian distribution with a standard deviation given by the theoretical RMS tilt.

With continuing reference to the data flow of FIG. 3, raw and/or registered pixel values may be evaluated using the TV-GMM 35 background PDF model for respective pixel location to produce a negative log likelihood (NLL 36) associated with each pixel. Pixel values that do not conform to the respective background model will exhibit a high NLL 36. A simple threshold 37 is applied to the NLL 36 data to produce the final detection mask. This step can be viewed as anomaly detection, or equivalently, a one-class classifier with only a background class PDF defined. The NLL 36 is convenient because the range of values encountered (i.e. 0 is a perfect match with the background model while a higher the value indicate more likelihood that a pixel is moving). One will recognize that other classification techniques are also feasible.

To define the TV-GMM 35 model, one may consider an M×M window about pixel n in the prototype image $\tilde{f}(n)$ where $M = 2\lceil 3 \max(\sigma_{R_x}(n), \sigma_{R_y}(n), 4) \rceil + 1$ with registration 32 or $M = 2\lceil 3 \max(\sigma_T(n), 4) \rceil + 1$ without registration 32. Significantly, this window size is selected as a multiple of the theoretical RMS tilt for the current turbulence level, as explained below. One of skill will recognize that any finite window which is large enough to capture a sufficiently large portion of the point spread function's (PSF) energy is suitable, including windows having shapes which are square, circular, oval, etc.

Figure 5:
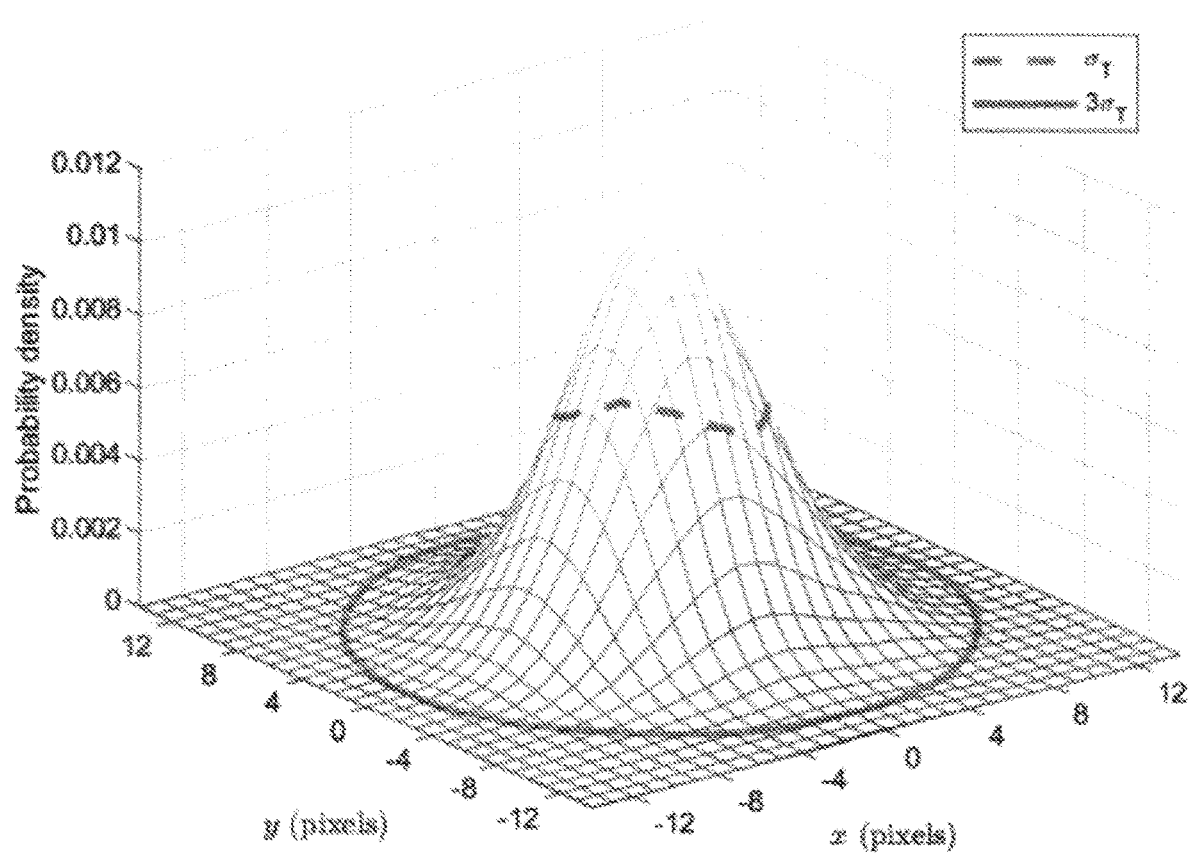
FIG. 5 is a graphical representation of Gaussian tilt distribution of 601×601 pixels across 300 frames subjected to a turbulence level of 4.

Referring to FIG. 5, the horizontal and vertical displacements across 300 frames of simulated level 4 turbulence are illustrated as a mesh plot, normalizing for a volume of 1. The theoretical Z-tilt or, shown as a dashed, (upper) generally horizontal line, captures approximately 68.2% of the Gaussian tilt distribution. To capture 99.7% of the Gaussian tilt distribution, the size of the window is set to span +/−3 times the RMS tilt as shown by the solid (lower) generally horizontal, subject to a practical minimum.

The TV-GMM 35 PDF may be determined using one mode for every sample in the local window as defined by:

$$\tilde{f}(n) = [\tilde{f}_1(n), \tilde{f}_2(n), \ldots, \tilde{f}_M(n)]^T \qquad \text{Eq. 8.}$$

The mean of mode m is the sample $\tilde{f}_m(n)$ for $m=1, 2, \ldots, M^2$ where m ranges from 1 to the number of pixels in the finite window. The weight of each mode is based on the sample's distance to the window center at location n scaled by the tilt variance. The weight function itself is a Gaussian to reflect the assumed Gaussian turbulence tilt distribution. Using the neighboring pixels to define the TV-GMM 35 modes accounts for the turbulence warping that effectively brings these neighboring pixel values to the test pixel location over the course of a temporal sequence.

The variance of all of the Gaussian modes in the window centered at pixel n are designated $\sigma(n)^2$. Such mode variances give each mode component a respective width. This term may be viewed as analogous to the smoothing kernel width in nonparametric kernel density-estimation methods 30. Increasing the mode variance tends to smooth out and broaden the overall TV-GMM 35 PDF. The TV-GMM 35 PDF is also used to address the quantization effect of building the GMM PDF from the discrete set of spatial samples in Eqs. 7 and 8. The TV-GMM 35 PDF may also be used to account for background intensity variations produced in the observation model in Eq. 6 which are not the direct result of spatial warping, such as observation noise and turbulence scintillation. Note that scintillation refers to intensity fluctuations cause by the amplitude variations in the propagated wavefront at the pupil plane. A useful value for the mode variance in the model is $\sigma^2(n) = \hat{\sigma}^2(n) + \sigma_\eta^2$, where $\hat{\sigma}^2(n)$ is the sample variance estimate as determined above computed from the elements in Eq. (6) and $\sigma_\eta^2$ is the additive noise variance.

Using the approach described above, for monochrome images the resulting TV-GMM PDF may be expressed as:

$$p_n(\phi) = \frac{1}{W(n)} \sum_{m=1}^{M^2} w_m(n) \frac{1}{\sqrt{2\pi\sigma(n)^2}} \exp\left\{-\frac{(\phi - \tilde{f}_m(n))^2}{2\sigma(n)^2}\right\}. \qquad \text{Eq. 9}$$

The normalized mode weights for both the cases with and without global registration 32 are given by:

$$W(n) = \Sigma_{m=1}^{M^2} w_m(n) \qquad \text{Eq. 10.}$$

In a variant embodiment the input image sequence $f_k(n)$ may consist of more than one color bands (e.g., RGB images, multispectral images, hyperspectralimages, etc.). In such a case one may construct a multivariate GMM according to:

$$p_n(\phi) = \frac{1}{W(n)} \sum_{m=1}^{M^2} w_m(n) \frac{\exp\left\{-\frac{1}{2}(\phi - \bar{f}_m(n))^T \sum(n)^{-1}(\phi - \bar{f}_m(n))\right\}}{\sqrt{(2\pi)^B |\sum(n)|}}.$$

Eq. 11

Where the weighting term $w_m(n)$ and the weighting normalization term $W(n)$ do not change, but $f_m(n)$ is now defined to be a B-element vector containing the pixel intensities for all B bands at pixel location n. Because this version of the probability density function is multivariate, the grayscale variance $\sigma^2(n)$ must be extended to be the covariance of each color band according to:

$$\Sigma(n) = \hat{\Sigma}(n) + \sigma_n^2 I$$

Eq. 12 where $\hat{\Sigma}(n)$ is the B×B covariance of f which is now of size $M^2 \times B$. $\sigma_n^2$ is an estimate of the noise that was present in $f_k$ but suppressed with registration 32 and the temporal median 33 operation. Similar to $\sigma^2(n)$, the present method 30 provides a particular form of $\Sigma(n)$.

The tilt variance determines the spatial area that the GMM modes cover and the likelihood that the neighboring pixels at various distances will be displaced by warping to the window center. Thus, the PDF for a small tilt variance tends to be more compact and dominated by samples very close to n. As the tilt variance increases, the local window and mode weight function expands and may end up spanning an edge or other structure. This expansion can result in the addition of modes having different means.

In a variant embodiment, the PDF scores for multiple pixels may be combined. Combining scores of multiple pixels may be performed to provide robustness against false positive motion due to single-pixel noise or to filter detections based on their size. As described in Eqs. 9 and 11, each individual pixel's probability is in the range of 0 (i.e., 0% likelihood of being part of the GMM) and 1 (i.e., a perfect fit with the GMM). Therefore, any mathematical product of these likelihoods is also in the range of [0,1]. Given an S×S superpixel around a subject pixel, the mathematical product of some or all of the pixels within the superpixel may be assigned as the output likelihood of the subject pixel. Although a particular description of a superpixel has been described, one of skill will recognize that a polygon of any size/shape may be utilized thusly. Additionally, one of skill will recognize that such a collection of pixels need not be adjacent to each other nor belong to the same image.

Figure 6A:
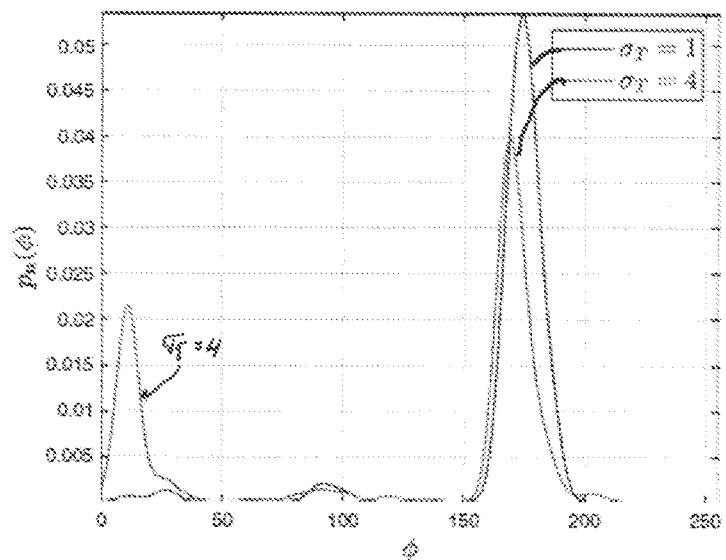
FIG. 6A a tilt variance Gaussian mixture model probability density of a first local prototype image window for a Gaussian mode variance of 20 and mode weighting with $\sigma T=1$ pixel and $\sigma T=4$ pixels.
Figure 6B:
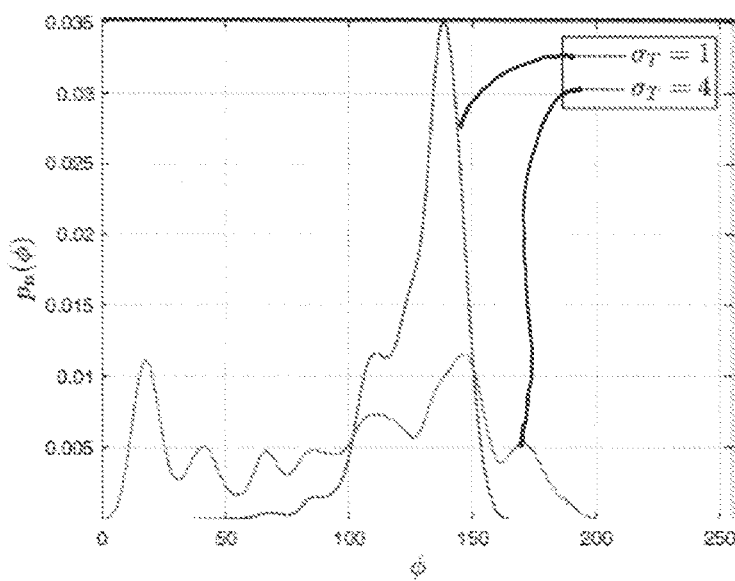
FIG. 6B a tilt variance Gaussian mixture model probability density of a first local prototype image window for a Gaussian mode variance of 20 and mode weighting with $\sigma T=1$ pixel and $\sigma T=4$ pixels.

Referring to FIGS. 6A and 6B, the impact of the tilt variance on the TV-GMM 35 PDF of Eq. 9 is illustrated for two different windows and two different tilt variances. The tilt variance determines the spatial area that the GMM modes cover, and the likelihood that the neighboring pixels at various distances will be displaced by warping to the window center. Thus, the PDF for a small tilt variance tends to be more compact and dominated by samples very close to n. As the tilt variance increases, the local window and mode weight function both expand and may end up spanning an edge or other structure. Spanning an edge or other structure can result in the addition of modes with very different means, illustrating that the tilt variance plays a key role in forming the TV-GMM 35 PDF.

In a variant embodiment, the negative log likelihood (NLL 36) may be used instead of the PDF likelihood values. The NLL 36 value can be a more convenient detection statistic because of the range of values encountered. When using the NLL 36, a large value corresponds to an anomalous intensity value relative to the background model, indicating a likely moving object or other in-scene 21 motion. The NLL 36 is given by:

$$Z_k(n) = -\ln(p_n(\hat{f}_k(n))$$

Eq. 14.

The TV-GMM 35 classifier will only detect motion that causes a change in pixel intensity. Motion along the optical axis or other scene 21 motion that does not create an intensity change is not detected by this approach.

In cases of heavy turbulence, the local window often becomes larger and more likely to contain a number of pixels of very similar or identical intensities. This effect gives rise to multiple GMM modes with similar or identical means, but likely different weights. Optionally one of skill may reduce computational requirements and redundancy by using Lloyd's quantization to combine modes with similar means to yield a smaller total number of modes. The resulting mode means are the representation values from the quantizer. The resulting mode weights are the sums of the original constituent mode weights within each quantization bin. Alternatively, the inventors have found that combining modes with duplicate means image results in a substantially more compact statistical model with negligible impact to motion-detection accuracy.

In principle, the TV-GMM 35 method 30 of the present invention is advantageously fully parallelizable at the pixel level for all steps after the registration 32 step. And the registration 32 itself is parallelizable at the frame level. The parameters of TV-GMM are obtained very efficiently from a single prototype image. The mode means are mappable directly from neighboring pixels within the prototype image and advantageously require no calculations. The mode variances are obtainable from the prototype image using a sample variance estimate. This manner of obtaining mode variance is in contrast with many prior art GMM background models which require iterative estimation of the parameters using expectation maximization and/or k-means on the raw image sequence.

Knowing the likelihood that a particular pixel represents actual movement or an artifact of optical turbulence provides several advantages to the user. This likelihood may be used for several practical technical effects. Exemplary uses include image processing, such as aided target recognition.

For example, one use of the likelihood a particular pixel is moving is to perform initial scene 21 detection for target tracking. If, a drone looks upon a scene 21 and pixels having apparent motion are present in the scene 21, one may wish to track aggregates of those pixels as targets, if present and actually moving. For example, if a wide-scene 21 image shows apparent movement along a road, it can be useful to determine whether the moving pixels represent optical turbulence or a moving convoy. Optical turbulence can be ignored while a moving convoy can be tracked for further analysis.

Another use relates to scene 21 analysis. In scene 21 analysis one may study behavior of life. For example, one may study traffic patterns on an interstate highway. Normal patterns may show traffic moving eastbound and westbound at steady state highway speeds. Anomalous pixels may represent optical turbulence or may represent a disruption in traffic flow. Optical turbulence may be ignored while a disruption in traffic flow may prompt a call for a tow truck or emergency vehicles.

Another use relates to scene 21 analysis. For example, a blurred image may be deconvolved using a point spread function to yield a more pristine image. The point spread function is a measure of how energy is has been dispersed from each pixel may be advantageously defined by the blur of the image, which in turn is defined by the likelihood that an individual pixel or group of pixels is real motion. Knowing the likelihood that a pixel represents blur vs true motion allows one to pull out the turbulence effects and create a more pristine image from the blurred image.

Another use relates to image restoration. One may consider a temporal frame stack having aligned pixels. A subject pixel with a particular X-Y coordinate may have an average grey scale value. Values outside of a threshold 37 deviation from the average are considered to be moving and may be disregarding as relates to a stationary pixel or used to track actual motion.

Figure 7A:
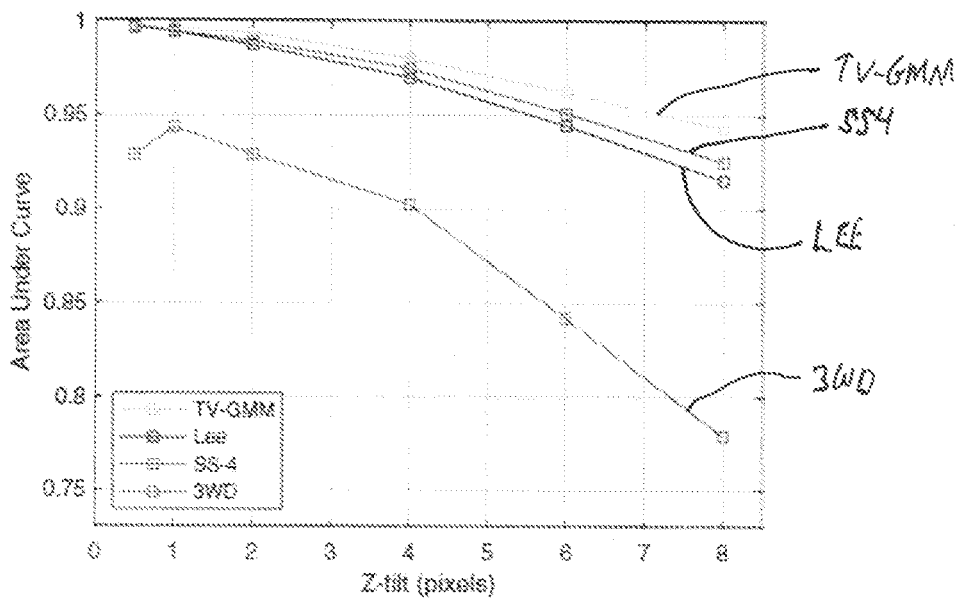
FIG. 7A is a receiver operating characteristic curve as a function of turbulence RMS Z-tilt for a first image comparing the performance of the method of the present invention to the performances of three methods according to the prior art.
Figure 7B:
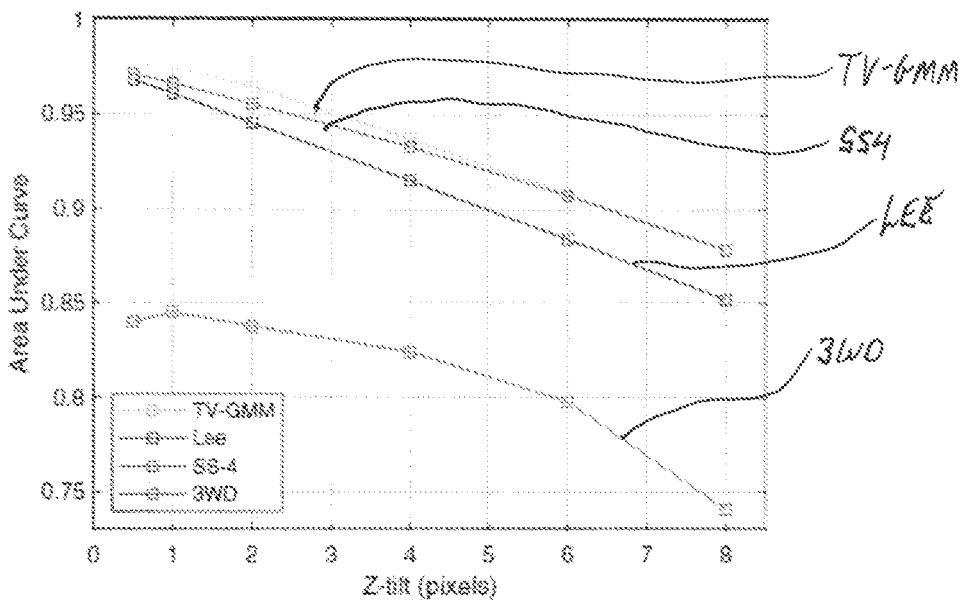
FIG. 7B is a receiver operating characteristic curve as a function of turbulence RMS Z-tilt for a second image comparing the performance of the method of the present invention to the performances of three methods according to the prior art.
Figure 7C:
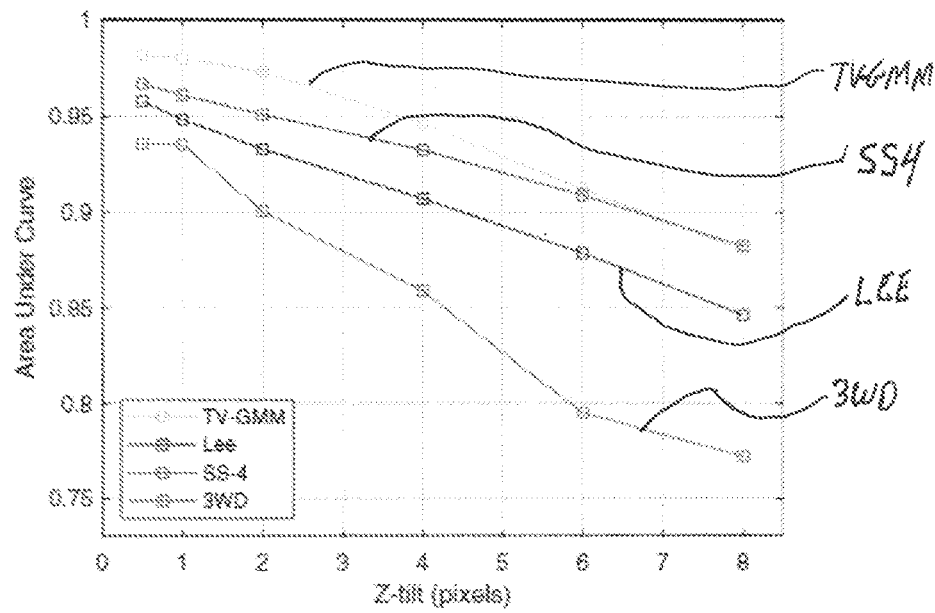
FIG. 7C is a receiver operating characteristic curve as a function of turbulence RMS Z-tilt for a third image comparing the performance of the method of the present invention to the performances of three methods according to the prior art.

Referring to FIG. 7A, FIG. 7B and FIG. 7C, the TV-GMM 35 anomaly detection method 30 of the present invention is compared to three method 30s shown in the prior art:

Lee's method 30 using the adaptive-mixture learning method 30 which adaptively estimates a GMM to model the intensity fluctuation for each pixel based solely on empirical pixel measurements. The model accounts for both the background and the foreground by employing multiple modes. The implementation of this method 30 uses three modes for the GMM. In contrast with the TV-GMM 35 approach, this method 30 does not exploit any a priori knowledge of the turbulence statistics, but does require a certain number of input frames during its preliminary learning phase to allow the adaptive model to initially converge and begin to perform its best. Thus, the first 40 output frames were excluded from the performance metrics for all the methods 30 studied.

The SS-4 technique described is similar to #1 above, with two differences. The first difference is that SS-4 uses all the frames at one time to form the GMM parameter estimation. The second difference is that the number of GMM modes is adjusted dynamically based on the Akaike information criterion (AIC).

A three-way decomposition (3WD), which seeks to use low-rank matrix decomposition to distinguish among background, turbulence motion, and in-scene 21 motion. The tuning parameters for 3WD were optimized separately for each of the three data sets used.

All runs were implemented in MATLAB R2021a and a Windows 10 environment. The computer had an Intel Core i9-9980XE processor, 128 GB of RAM, and a pair of NVIDIA Titan RTX GPUs connected with an NVLink bridge. The synthetic data sets were created using a numerical wave-propagation anisoplanatic turbulence simulator. The use of GPUs for the calculation of the fast Fourier transforms (FFTs) in the numerical wave-propagation accelerated generation of each 300-frame data set improved from an average of 31,963 s to an average of 5114 s, an approximately 6.25 times improvement. The motion classification steps are implementable with prototype-level code and without GPU acceleration.

In all runs, the TV-GMM 35 NLL 36 from Eq. 14 is used for the decision statistic for per-pixel labeling of motion detection. From the NLL 36 images and truth maps, receiver operating characteristic (ROC) curves were generated to study classification performance at all possible operating points. Then, the areas under the ROC curves were computed to quantitatively compare the performance of each method 30. A higher area represents better classification performance, with an area of 1 being ideal. FIGS. 7A-7C show the areas under the ROC curves for images of three different traffic intersections, with data sets for all of the turbulence levels as listed in Table 2. The results in all trials employed global registration 32. As expected, the performance of all methods 30 declines as the turbulence strength increases. Higher $C_n^2$ values lead to higher turbulence Z-tilt, leading to more false positives from turbulence-driven apparent motion, particularly near edges and high-contrast regions of the background.

Figure 8:
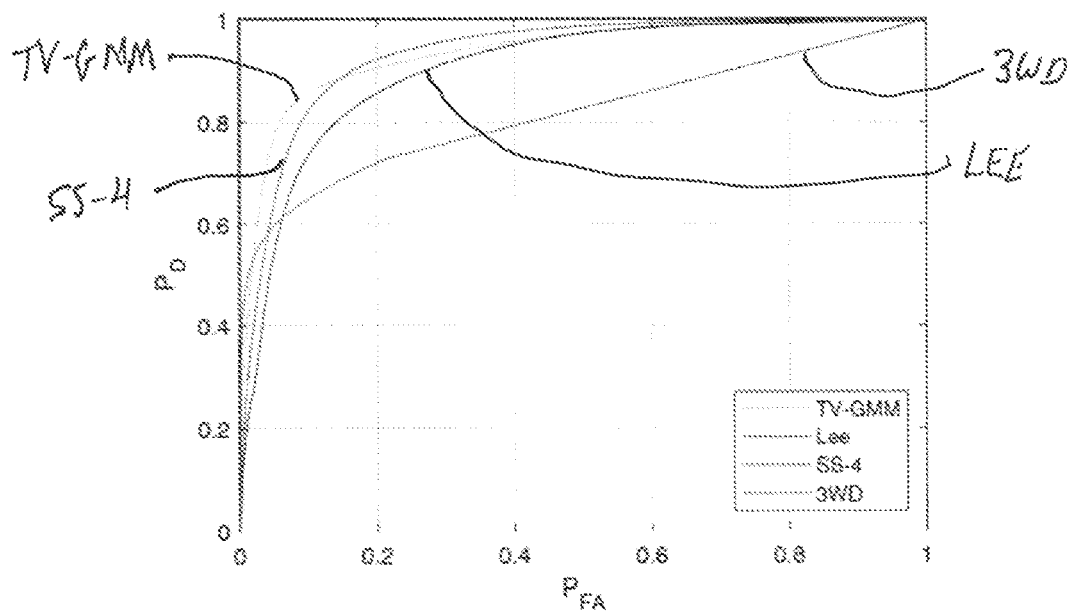
FIG. 8 is a receiver operating characteristic curve of probability of detecting a true moving pixel as a function of false positive detection rate for the second image, comparing the performance of the method of the present invention to the performances of three methods according to the prior art using a turbulence level of 4.
Figure 9A:
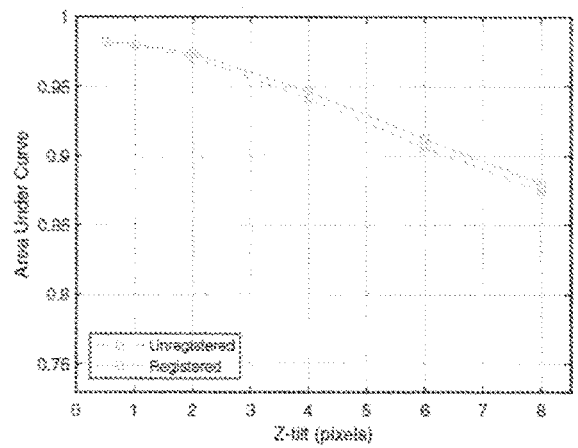
FIG. 9A is a receiver operating characteristic curve as a function of turbulence RMS Z-tilt for the second image, showing the performance of the method of the present invention comparing the tilt variance Gaussian mixture model with and without the global registration step.
Figure 9B:
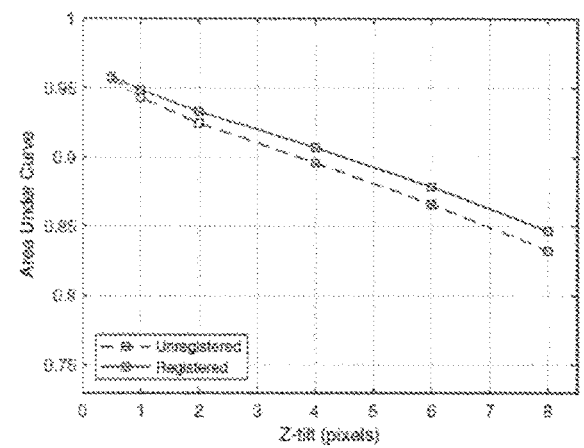
FIG. 9B is a receiver operating characteristic curve as a function of turbulence RMS Z-tilt for the second image, showing the performance of a method according to the prior art comparing the performance with and without the global registration step.
Figure 9C:
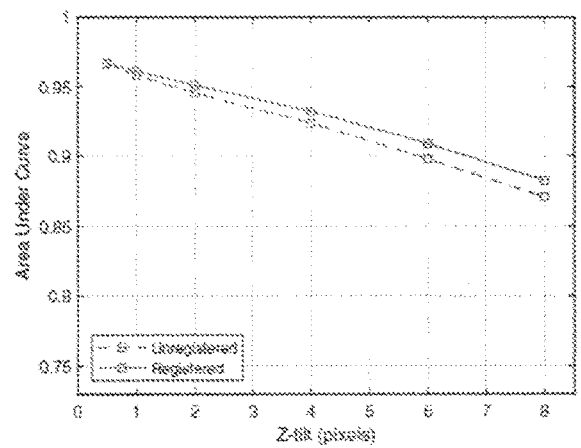
FIG. 9C is a receiver operating characteristic curve as a function of turbulence RMS Z-tilt for the second image, showing the performance of a method according to the prior art comparing the performance with and without the global registration step.
Figure 9D:
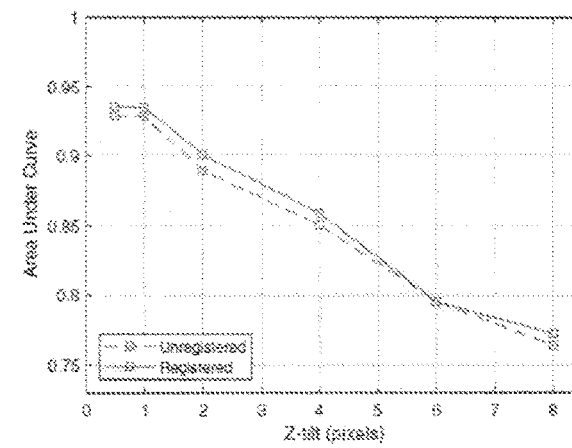
FIG. 9D is a receiver operating characteristic curve as a function of turbulence RMS Z-tilt for the second image, showing the performance of a method according to the prior art comparing the performance with and without the global registration step.

Referring to FIG. 8, TV-GMM 35 is more robust against such undesirable artifacts. The TV-GMM technique generally maintained the highest probability of detection PD up to a false detection rate of PFA=0.15.

The results in FIGS. 7A, 7B, 7C and 8 demonstrate that the TV-GMM 35 method 30 of the present invention outperforms the three prior art schemes across all turbulence conditions. Without being bound by theory, the superior performance of the TV-GMM 35 may be due to effectively exploiting knowledge of the turbulence tilt variance in combination with local spatial information provided by the background prototype image. In all of FIGS. 7A, 7B, 7C and 8 the rank order of the curves, from the top to the bottom of the graphs is: the TV-GMM of the first embodiment of the present invention; SS-4; Lee and 3WD as the lowest graph.

Referring to FIGS. 9A, 9B, 9C and 9D, the TV-GMM 35 may employ an optional image registration 32 step. In FIGS. 9A, 9B, 9C and 9D, the benefit of applying global registration 32 prior to the motion detection algorithms is shown, with the dashed lines representing unregistered image results and the solid lines representing images with global registration 32. There is a beneficial boost in the area under the ROC curves as a result of registration 32 for all method 30s at all turbulence levels. Advantageously, the relative boost tends to be larger at higher turbulence levels. Although the anisoplanatic turbulence tilt has a zero mean over time, in any given frame the average shift across the field of view of the camera can be significant. Thus, neutralizing the global turbulence tilts can significantly improve scene 21-motion detection performance.

The relative performance in rank order among four algorithms remains unchanged regardless of whether the optional registration 32 step is included or not. It is also noteworthy and unexpected that the TV-GMM 35 method 30 of the present invention without registration 32 meets or exceeds the performance of the other three algorithms with registration 32. Another benefit of the present invention is that one of skill may run the TV-GMM 35 without registration 32 to provide overall computational savings and simplify the precalculation of the tilt-variance statistics while having performance which meets or exceeds the three cited prior art method 30s.

Furthermore, without the optional image registration 32 step, the tilt variance may be calculated directly from an estimate of the Fried parameter. With image registration 32, one can assume a constant $C_n^2(z)$ profile so that the residual tilt variance may also be computed from an estimate of the Fried parameter. To demonstrate the advantageous performance of the TV-GMM 35 method 30 according to the present invention, relative to the estimation of the Fried parameter, the estimate of $C_n^2(z)$ was varied between 75% and 125% of the actual $C_n^2(z)$ value from the turbulence simulator for all three synthetic data sets. For level 4 turbulence, areas under the curve [AUC] degraded at most 0.15%. For level 6 turbulence, the AUC dropped at most 0.21%, demonstrating the methodology of the present invention is generally and advantageously insensitive to moderate errors in the atmospheric characterization.

Thus, one of skill will recognize that the TV-GMM 35 apparatus 15 and method 30 of the present invention produces a contamination-free prototype image, resulting in a contamination-free background model.

While the invention has been described as an apparatus 15 and method 30 for distinguishing foreground images from nonmoving background images, the invention is not so limited. In another embodiment the invention comprises a non-transitory computer readable medium suitable for and configured to carry out computations and determinations of any of the foregoing, including only as limited by the claims below, algorithms, calculations, estimates such as but not limited to Kalman estimates, iterative/recursive exercises, solving of equations/inequalities and determinations of any of the parameters listed in the claims below.

The disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computer, netbook computer), microprocessor-based or programmable consumer or industrial electronics, and the like. The illustrated aspects may be practiced in distributed computing environments where tasks are performed by remote processing devices linked through a communications network. In a distributed computing environment, program modules can be located in both local and remote memory storage devices.

Exemplary non-transitory computer readable media are physical, transferable, reproducible, may comprise all computer readable media except for a transitory propagating signal and particularly include flash drives, magnetic strips, optical drives, CDs, DVDs, internal/external hard drives, more particularly internal/external solid state hard drives, and further exclude RAM, volatile memory requiring power for data storage, signals and effervescent carrier waves. In an alternative embodiment, transitory computer readable media may also be used.

Terms such as "store," "storage," "data store," data storage," "database," and substantially any other information storage component relevant to operation and functionality of a component, refer to "memory components," or entities embodied in a "memory" or components comprising the memory. By way of non-limiting illustration, and not limitation, volatile memory, non-volatile memory, disk storage, and memory storage. Further, non-transitory memory can be included in read only memory(ROM), programmable ROM (PROM), electrically programmable ROM (EPROM), electrically erasable ROM (EEPROM), or flash memory. Transitory memory can comprise random access memory(RAM), which acts as external cache memory. By way of non-limiting illustration, RAM is available as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a signal processor or a block of random access memory, hard disk, or the like) or multiple pieces of hardware. Similarly, the programs may be standalone programs, may be incorporated as subroutines in an operating system, may be functions in an installed software package, and the like. It should be understood that the various embodiments are not limited to the arrangements and instrumentality shown in the drawings.

What is claimed is:

1. A method of determining the likelihood a pixel in a video image subject to optical turbulence represents true motion, the method comprising the steps of:
   a. capturing incoming light from a scene with an image capture device to yield an original video having a sequence of frames;
   b. creating a prototype image from the sequence of frames, the prototype image being a geometrically accurate representation of the scene and substantially free of contamination caused by true scene motion;
   c. estimating a local atmospheric turbulence profile;
   d. applying geometric distortions to the prototype image, the geometric distortions being statistically consistent with the estimated atmospheric turbulence profile; thereby creating multiple realizations of the prototype image without substantially duplicating one or more blurring effects;
   e. selecting a subject pixel location from each pixel location available in the prototype image;
   f. extracting a finite window for each subject pixel location, whereby the subject pixel location is contained within the window;
   g. forming a multivariate Gaussian model having a probability density function associated with a respective pixel location, whereby an intensity of each pixel in the window is treated as a separate variable;
   h. repeating steps e through g for all pixel locations;
   i. evaluating each pixel at the subject pixel location in the original image sequence against the probability density function from the multivariate Gaussian model to determine a likelihood that each pixel at the subject pixel location represents true motion within the original video; and
   j. repeating step i for all pixels locations and all frames within the prototype image have been evaluated and probabilities therefor have been determined.

2. A method according to claim 1 further comprising the step of using the probabilities that a plurality of pixels in the original image for subsequent image analysis or image processing.

3. A method according to claim 2 wherein the step of using the probabilities that a plurality of pixels in the original image for subsequent image or image processing analysis comprises at least one of turbulence mitigation, image restoration and target tracking.

4. A method according to claim 1 further comprising the step of converting the probability density function for each pixel, to a negative log likelihood value proportional to the likelihood that the subject pixel represents true motion within the original image.

5. A method according to claim 4 wherein said negative log likelihood ranges from 50 to 1000.

6. A method according to claim 1 wherein the number of realizations within the sequence of frames is 500+/−50 frames.

7. A method according to claim 1 further comprising the step of spatially registering the frames within the sequence of frames to a reference frame via a whole-pixel translation.

8. A method according to claim 7 wherein the sequence of frames is spatially registered using a least-mean-squares approach to a reference frame.

9. A method according to claim 1 wherein the prototype image is produced by a rank filter.

10. A method according to claim 9 wherein the rank filter is a temporal median filter.

11. A method according to claim 1 whereby the window is a M×M matrix and the subject pixel is generally centered within the window.

12. A method of determining the probability a pixel in a video image subject to optical turbulence represents true motion, the method comprising the steps of:
   a. capturing incoming light from a scene with an image capture device to yield an original video having a sequence of frames;
   b. creating a prototype image from the sequence of frames, the prototype image being a geometrically accurate representation of the scene and substantially free of contamination caused by true scene motion;
   c. estimating a local atmospheric turbulence profile;
   d. applying geometric distortions to the prototype image, the geometric distortions being statistically consistent with the estimated atmospheric turbulence profile; thereby creating multiple realizations of the prototype image without substantially duplicating one or more blurring effects;
   e. selecting a subject pixel location from each pixel location available in the prototype image;
   f. extracting a finite window for each subject pixel location, whereby the subject pixel location is contained within the window;
   g. forming a multivariate Gaussian model having a probability density function associated with a respective pixel location, whereby an intensity of each pixel in the window is treated as a separate variable;
   h. evaluating a pixel at the subject pixel location in a subject original frame against the probability density function from the multivariate Gaussian model to determine a probability that the pixel at the subject pixel location in the sequence of frames represents true motion within the original video;
   i. repeating step h until all pixels at that subject pixel location have been evaluated and probabilities therefor have been determined;
   j. selecting a different subject pixel location; and
   k. repeating steps e through j in sequence until all pixels within the sequence of frames have been evaluated and probabilities for each pixel location of the video image have been determined.

13. A method according to claim 12 wherein the geometric distortions are taken from a turbulence warping simulator.

14. A method according to claim 13 wherein the geometric distortions are taken from an anisoplanatic turbulence warping simulator.

15. A method according to claim 12 further comprising the step of using the probabilities that a plurality of pixels in the original image for subsequent image analysis or image processing.

16. A method according to claim 15 wherein the step of using the probabilities that a plurality of pixels in the original image for subsequent image or image processing analysis comprises at least one of turbulence mitigation, image restoration and target tracking.

17. A method according to claim 12 further comprising the step of spatially registering the realizations to the prototype image via a whole-pixel translation.

18. A method according to claim 14 wherein the translation is limited to 3× the tilt variance, as determined by the anisoplanatic turbulence warping simulator.

19. A method of determining the likelihood a pixel in a video image subject to optical turbulence represents true motion, the method comprising the steps of:
   capturing incoming light from a scene with an image capture device to yield an original image having a sequence of frames;
   creating a prototype image from the original image as a geometrically accurate representation of the scene, the prototype image being substantially free of contamination caused by true scene motion;
   creating plural realizations of the prototype image using an anisoplanatic turbulence simulator;
   creating a multi-variate Gaussian model based upon the plural realizations;
   deriving a likelihood function from the multi-variate Gaussian model; and
   evaluating each pixel in the original image sequence against the prototype image using the likelihood function to yield a likelihood that the respective pixel represents true motion.

20. A method according to claim 19 wherein the turbulence simulator is a geometric warping turbulence simulator.

* * * * *